United States Patent [19]

Kihara

[11] Patent Number: 4,502,117
[45] Date of Patent: Feb. 26, 1985

[54] DMA BUS LOAD VARYING UNIT

[75] Inventor: Jyun-ichi Kihara, Tokyo, Japan

[73] Assignee: Tokyo Shibaura Denki Kabushiki Kaisha, Kawasaki, Japan

[21] Appl. No.: 469,300

[22] Filed: Feb. 24, 1983

[30] Foreign Application Priority Data

Mar. 4, 1982 [JP] Japan .................. 57-34468

[51] Int. Cl.³ .............. G06F 11/00; G06F 13/00; G06F 15/40
[52] U.S. Cl. .................................................. 364/200
[58] Field of Search ... 364/200 MS File, 900 MS File, 364/551

[56] References Cited

U.S. PATENT DOCUMENTS 4,096,567 7/1978 Millard et al. ............. 364/200
4,159,534 6/1979 Getson, Jr. et al. .......... 364/200

Primary Examiner—Harvey E. Springborn
Assistant Examiner—William G. Niessen
Attorney, Agent, or Firm—Kenyon & Kenyon

[57] ABSTRACT

A DMA bus load varying unit applied to a data processing system has a DMA bus and a memory connected to the DMA bus is provided with a mode designating circuit for designating a memory read and write operation, a continuous operation of the memory read and write operation, and a start and stop operation of the memory read and write operation for the memory, a clock-pulse generator connected to said mode-designating circuit, a period counter connected to the clock-pulse generator for counting clock-pulse signals from the clock-pulse generator, a period-setting circuit for specifying an arbitrary period, a first comparator for comparing the output from the period counter with the output from the period-setting circuit and for producing a first coincident signal when they are equal, a flip-flop connected to the first comparator for producing the DMA bus request signal in accordance with the coincident signal; DMA bus circuit connected to the mode-designating circuit and the flip-flop which is triggered by the DMA bus request signal and performs the memory access through the DMA bus in accordance with the mode designated by the mode-designating circuit, a size counter connected to the DMA bus circuit for counting the number of the DMA bus cycles of said DMA bus circuit, a transfer data size-setting section for specifying an arbitrary transfer data size, a second comparator for comparing the output from the size counter and the output from the transfer data size-setting section and for producing a second coincident signal when they are equal, the second coincident signal being supplied to initialize the DMA bus circuit, and a timer for counting clock pulses from the clock pulse generator to perform time measurement until a specified data transfer is completed.

6 Claims, 3 Drawing Figures

DMA BUS LOAD VARYING UNIT

BACKGROUND OF THE INVENTION

The present invention relates to a DMA bus load varying unit.

A conventional data processing system having a DMA bus is shown in FIG. 1. A main memory 2, a central processing unit (CPU) 3, DMA units (channel) 4 and so on are connected to the DMA bus 1. Such a system is so constructed that when any of the units described above produces a request for accessing the main memory 2, the unit may acquire the DMA bus in accordance with a physically-defined priority.

In such a conventional system, a test operation has been performed on the DMA units so that any selected one of the DMA units 4 can be operated at a time. This method disables the test operation of contention among the DMA units. The actual test operation necessitates a plurality of DMA units. Furthermore, the test program should be constructed using a multiprogramming technique such that a plurality of DMA units are operated in a multiplexed manner. Still further, the test operation of the system performance such as the operation speeds of the CPU and the DMAs at the maximum load of the DMA bus also necessitates a plurality of DMA units and the multiprogramming technique. To evaluate the performance of the DMA bus, the system should be so constructed that a plurality of DMA units 4 are connected to the DMA bus to estimate each busy time of the DMA units by means of a measuring unit 5.

The measurement of the busy time will now be further described.

As is well known, when two or more DMA units connected to the DMA bus attempt to perform data transfer simultaneously, the DMA unit having lower priority must be in a waiting mode. When the DMA unit having lower priority is connected to a unit which operates in synchronism with a mechanical operation such as a magnetic disk unit, a timing error might be caused in which the next data is transferred before the previous data due to the long waiting time. Therefore, a data buffer is sometimes provided with the DMA unit to prevent a timing error. The wait time of the DMA unit is essential in order to determine the buffer size of the data buffer. Further, the above wait time is also necessary to determine an optimal system in which optimal priorities are assigned to the DMA units having different operation speeds.

In the prior art, the actual system has been constructed to evaluate the busy time of each DMA unit in accordance with the measurement from the measuring unit.

SUMMARY OF THE INVENTION

The object of the present invention is to provide a DMA bus load varying unit which easily performs a contention test of the DMA unit, maximum load test of the DMA bus and evaluation of the system performance without a plurality of DMA units being connected to the DMA bus.

Another object of the present invention is to provide a DMA bus load varying unit which easily performs the maximum load test of the DMA bus and the evaluation of the DMA bus performance, thereby determining the buffer size of the DMA unit as part of the system design process, assigning an optimal priority level to the DMA unit, and thereby achieving effective system design.

To achieve the above object there is provided a DMA bus load varying unit applied to a data processing system having a DMA bus and a memory connected to the DMA bus, comprising:

a. mode-designating means for designating a memory read and write operation, a continuous operation of the memory read and write operation, and a memory start and a memory stop operation of the memory read and write operation;

b. clock-pulse generating means connected to said mode-designating means;

c. first counting means connected to said clock-pulse generating means for counting clock signals from said clock-pulse generating means;

d. period setting means for specifying an arbitrary period;

e. first comparing means for comparing the output from said first counting means with the output from said period-setting means and for producing a first coincident signal when they are equal;

f. DMA bus request signal generating means connected to said first comparing means for producing the DMA bus request signal in accordance with the coincident signal;

g. DMA bus circuit means connected to said mode-designating means and said DMA bus request signal generating means which is triggered by the DMA bus request signal and performs the memory access through the DMA bus in accordance with the mode designated by said mode-designating means;

h. second counting means connected to said DMA bus circuit means for counting the number of DMA bus cycles of said bus circuit means;

i. transfer data size-setting means for specifying an arbitrary transfer data size;

j. second comparing means for comparing the output from said second counting means and the output from said transfer data size-setting means and for producing a second coincident signal when they are equal, the second coincident signal being supplied to said DMA bus circuit means to initialize.

BRIEF DESCRIPTION OF THE DRAWINGS

Other objects and features of the present invention will be apparent from the following description taken in connection with the accompanying drawings in which.

DETAILED DESCRIPTION OF THE PREFERRED EMBODIMENT

Now an embodiment of the present invention will be described referring the drawings.

Figure 1:
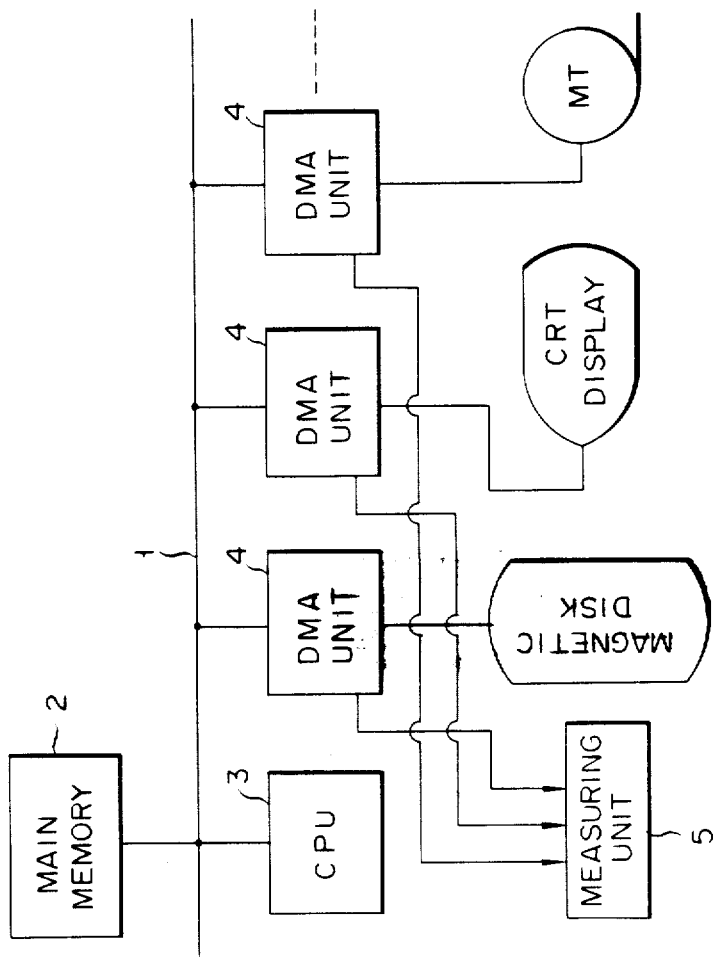
FIG. 1 is a block diagram showing a conventional data processing system in which a measuring unit for the evaluation of the DMA bus performance is added.
Figure 2:
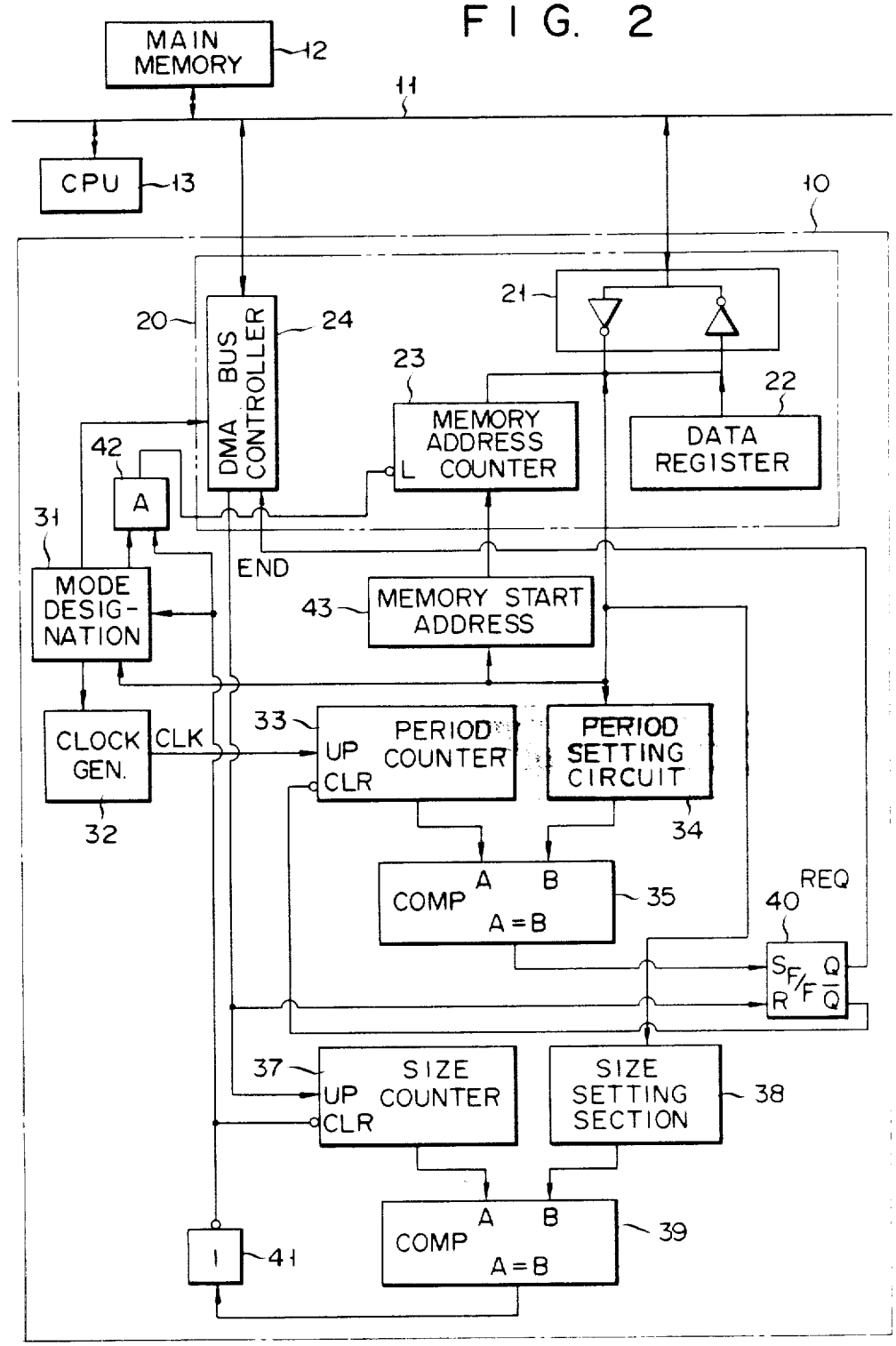
FIG. 2 is a block diagram showing an embodiment of the present invention.

In FIG. 2, a DMA bus load varying unit 10 is connected to a DMA bus 11 and is provided with a DMA bus circuit 20 which is similar to a DMA bus circuit of a conventional DMA unit. In the DMA bus circuit 20, a transceiver 21 transmits data onto and receives data from the DMA bus 11. A data register 22 for holding data and a memory address counter 23 for generating memory addresses for accessing a main memory 12 are connected to the transceiver 21. A DMA bus control circuit 24 responds to a DMA request signal REQ from a F/F 40 to be described later and functions to perform the memory access through the DMA bus 11 in accordance with the contents of a mode-designating section 31. Furthermore, the DMA bus control circuit 24, for example, counts up the contents of the memory address counter and produces a completion signal END each time one DMA bus cycle is completed.

The mode-designating section 31 designates memory read and memory write operations, a continuous memory read/write operation and the start and stop fuction of the memory read/write operation. These operation designations are enabled by a central processing unit (CPU) 13 executing a test program in the main memory and setting a corresponding command in the mode-designating section 31. When the mode-designating section 31 is given a start command from the CPU 13, the section 31 produces a start pulse (effective at logical "0") and enables an operation signal. When the continuous operation is not designated, the mode-designating section 31 disables the operation signal at the trailing edge of the output signal from an inverter (I) 41 to be described later. On the other hand, when continuous operation is designated, the section 31 also functions to disable the operation signal in accordance with a stop command from the CPU 13.

A clock generator 32 produces a clock signal during the period that the operation signal from the mode-designating section 31 remains effective. A period counter 33 is, for example, an up-counter for counting the number of pulses of the clock signal. The period counter 33 is cleared at the trailing edge of the $\overline{Q}$ output of the F/F 40. An arbitrary transfer rate is set in the period setting circuit 34. A comparator 35 compares the output from the period counter 33 with the contents of the period setting circuit 34 to produce a coincidence detection signal (for example, logical 1) when they are equal. A size counter 37 counts each time the completion signal END is produced from the DMA bus control circuit 24. The size counter counts the number of DMA bus cycles, that is the size of the transfer data. The size counter 37 is cleared at the trailing edge of the output of the I 41. An arbitrary transfer data size of the memory read/write operation is set in the size-setting section 38. The comparator 39 compares the output from the size counter 37 with the contents of the size-setting section 38 to produce a coincidence detection signal when they are equal. The flip-flop (F/F) 40 comprises, for example, an RS flip-flop. The result from the comparator 35 is supplied to the set input terminal S of the F/F 40, and a completion END signal from the DMA bus control circuit 24 is supplied to the reset input terminal R. The Q output of the F/F 40 is supplied to the DMA bus control circuit 24 as the DMA bus request signal REQ (effective at REQ="1"). Furthermore, the $\overline{Q}$ output of the F/F 40 is led to the clear terminal CLR of the period counter 33. The result from the comparator 39 is input to the I 41. The output of the I 41 is led to the clear terminal CLR, the mode-designating section 31, etc. The start pulse from the mode-designating section 31 and the output from the I 41 are supplied to an AND gate 42. The output of the AND gate 42 is supplied to a load terminal L of the memory address counter 23. An arbitrary memory start address of the memory read/write operation is set in the memory start address section 43. The contents of the memory start address section 43 are loaded into the memory address counter 23 at the trailing edge of the AND gate 42.

An embodiment of the present invention will now be described.

Arbitrary values are set in the period-setting section 34, the size-setting section 38 and memory start address section 43 by the CPU 13 executing a test program stored in the main memory 12. That is, an arbitrary transfer period, an arbitrary transfer data size (actually the number of DMA bus cycles) and a memory start address are set in the period-setting section 31, the size-setting section 38 and the memory start address section 43, respectively.

When a start command such as the memory read operation or the memory write operation is set in the mode-designating section by the CPU 13 through the DMA bus 11 and the transceiver 21, the operation of the DMA bus load varying unit 10 starts.

When the start command of a memory read/write operation is designated, the mode designating section 31 produces a logical "0"(negative) start pulse to the AND gate 42. Therefore, the logical "0" pulse is supplied to the load terminal L of the memory address counter 23 from the AND gate 42. At the trailing edge of the pulse, the contents of the memory start address section 43, that is the memory start address, is loaded in the memory address counter 23. Furthermore, the mode-designating section 31 enables the operation signal. Therefore, the clock circuit 32 generates a clock signal CLK. The period counter 33 counts the number of pulses of the clock signal CLK. The comparator 35 compares the output from the period counter 33 with the contents of the period-setting section 34 and produces a coincidence detection signal of logical "1" when the coincidence is detected. The F/F 40 is set by the coincidence detection signal. Thus, the Q and $\overline{Q}$ outputs of the F/F 40 are logical "1" and logical "0", respectively. The Q output logical "1" of the F/F 40 is supplied to the DMA bus control circuit 24 as an effective DMA bus request signal REQ. On the other hand, the $\overline{Q}$ output of the F/F 40 is supplied to the clear terminal CLR of the period counter 33.

Thus, the period counter 33 is cleared. When the period counter 33 is cleared, the comparator 35 detects non-coincidence to inhibit the output of the coincidence detection signal. As a result, the period counter 33 starts its counting operation again.

The DMA bus control circuit 24 receives the DMA bus request signal REQ from the F/F 40 to perform the memory class to the main memory 12 in accordance with the contents (memory read or memory write designation) of the mode-designating section 31. When one DMA bus cycle is completed, the DMA bus control circuit 24 counts up the memory address counter 23 to prepare for the next DMA bus cycle and produces the completion signal END. Then, the contents of the size counter 37 are incremented by 1. The comparator 39 compares the output from the size counter 37 with the contents of the size-setting section 38. When the comparator 39 detects non-coincidence, that is, when the transfer data size does not coincide with the designated size (when the actual DMA bus cycle number does not coincide with the designated cycle number), the coincidence detection signal is not produced, and the operation described above will be repeated.

On the other hand, when the comparator 39 detects coincidence, the coincidence detection signal of logical "1" is produced from the comparator 39. The coincidence detection signal is supplied to the I 41. The I 41 inverts the level of the coincidence detection signal to supply it to the clear terminal CLR of the size counter 37, the mode-designating section 31 and the AND gate 42. Therefore, the size counter 37 is cleared. Furthermore, the output of the AND gate 42 falls so that the contents of the memory start address section 43 are loaded into the memory address counter 23 at the trailing edge of the output (as in the case of the start operation).

As has been described above according to the embodiment, the DMA load-varying unit 10 is connected to the DMA bus 11. Further, arbitrary information is set in the period-setting section 34, the size-setting section 38, the memory start address section 43 and the mode-designating section 31. Therefore, the bus request and the operation of the DMA bus can be performed in the arbitrary transfer period, in the arbitrary transfer area (the number of DMA bus cycles) and in the arbitrary mode (read/write).

Therefore the connection of the DMA load-varying unit 10 and a single DMA unit to the DMA bus 11 provides the following advantages.

I. As the transfer period can be set (variable period), substantially the same effect can be obtained as with a plurality of DMA units connected to the DMA bus 11 using a single DMA load-varying unit. Therefore, a contention test operation for a desired condition can be performed with the single DMA unit.

II. Furthermore, the DMA unit test program for the single DMA unit is the same as the test program for operating a single DMA unit in a prior art. That is, the contention test operation of the DMA unit can be performed without any modification of the prior DMA unit test program and without the multi-programming.

III. As can be seen from the statement I, the maximum load test can be performed very easily.

IV. In relation to the load of the DMA bus, the evaluation of the system performance, such as the operation speeds of the CPU and the DMA unit, can be performed easily.

V. The evaluation of the contention of a memory system of an interleaved type can be performed easily. This is because the transfer area can be set arbitrarily, that is, the transfer data size is variable, a plurality of interleaved memories can be alternatively accessed by the function described in I.

Now another embodiment of the present invention will be described referring to FIGS. 2 and 3. Like reference numerals designate identical or corresponding parts in FIG. 2 and their description will be omitted. In the DMA bus varying unit of FIG. 3, the timer 51 counts pulses of the clock signal CLK generated from the clock circuit 32, that is, it has a time-counting function.

The count result of the timer 51 is output onto the DMA bus 11 through the transceiver 21 in response to a request from the CPU 13. The DMA bus load varying unit 50 of the embodiment in FIG. 2 differs from the DMA bus load varying unit 10 of the embodiment in FIG. 3 in that the timer 51 is provided in the latter.

When the DMA bus load varying unit 50 starts operation in a manner as described in the previous embodiment, the clock circuit 32 generates a clock signal CLK corresponding to the operation signal (effective) from the mode-designating section 31. The timer 51 counts the pulses of the clock signal CLK. Suppose that the memory access is repeated under this condition and the count output of the size counter 37 coincides with the contents of the size-setting section 38. This implies that the designated data transfer is completed. Then, the comparator 39 produces a coincidence detection signal of logical "1". When the mode-designating section 31 is not given the memory read/write continuous operation signal by the CPU 13, the section 31 disables the operation signal in accordance with the coincidence detection signal of logical "1". Then, the clock circuit 33 inhibits the generation of the clock signal CLK. Thus, the counting operation of the timer 51 is halted. This means that the timer 51 counts the number of pulses of the clock signal CLK during the operation of the clock circuit 32.

As apparent from the above description, according to the embodiment, the time T from the start of the DMA bus load varying unit 50 to the end of the designated data transfer can be counted by the timer 51 provided with the bus load varying unit 10.

The time $T_M$ (memory cycle) required for the memory access in a single data transfer is constant. Therefore, when data transfer of n times (size n) is designated, the total time required for the memory access for the data transfer area of size n is $n \cdot T_M$. Usually, the time $n \cdot T_M$ does not coincide with the time T so that the difference $\alpha$ $(=T-n \cdot T_M)$ between the time T and the time $n \cdot T_M$ represents the wait time unit the designated data transfer is completed.

Therefore, the following advantages can be obtained by connecting a plurality of DMA bus load varying units to the DMA bus 11 without any of the actual DMA units being connecting to the bus 11.

I. The counting of the wait time caused by the contention can be performed so that the evaluation of the DMA bus performance can be performed easily.

II. The size of the data buffer required for the DMA unit provided with a buffer can be determined in accordance with the function described in I prior to the system design.

III. The optimum priority assignment for the respective DMA units can be performed before operating the actual system.

Figure 3:
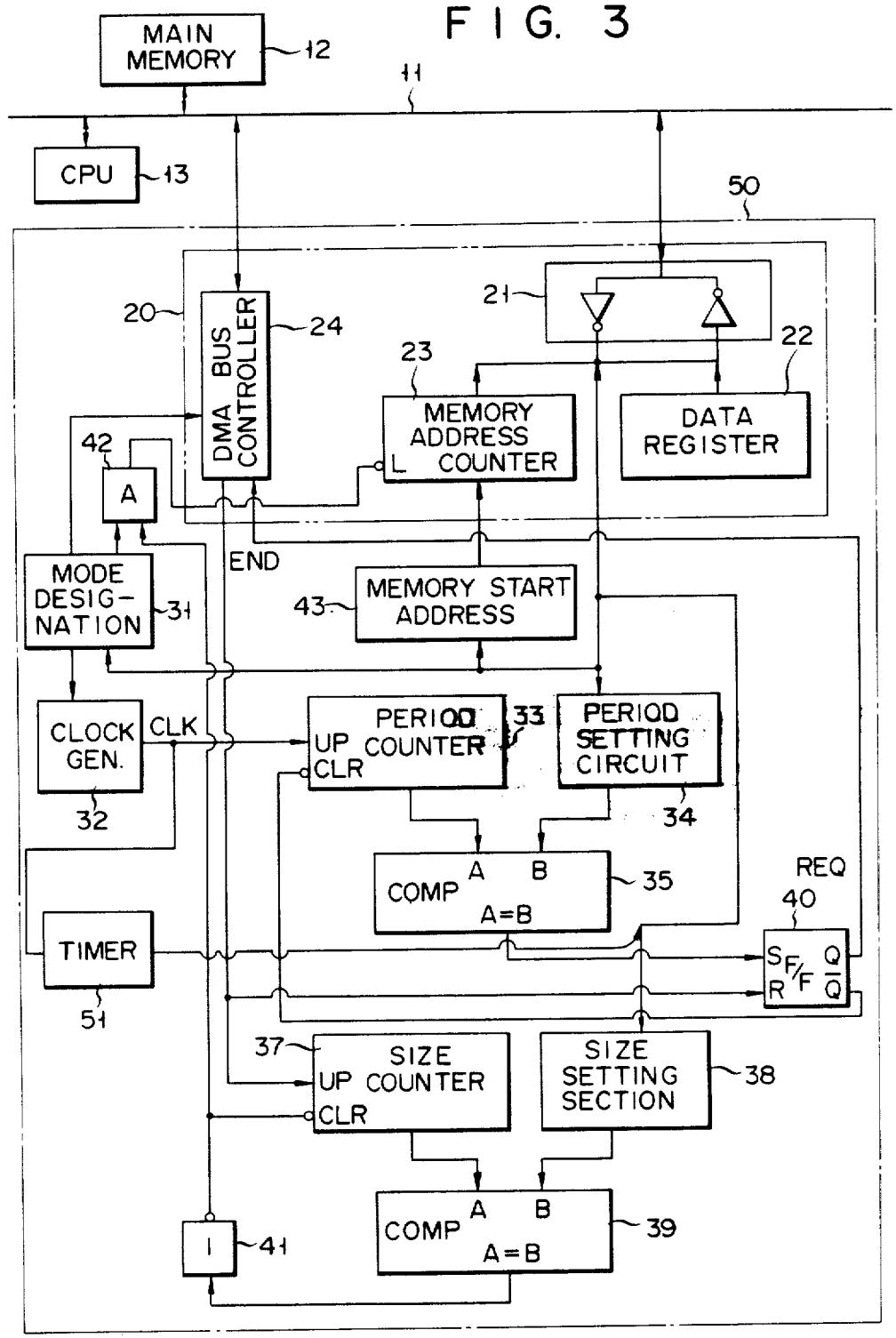
FIG. 3 is a block diagram showing another embodiment of the present invention.

It has been described that the period counter 33 and the size counter 37 in FIGS. 2 and 3 comprise up-counters. However, these counters 33 and 37 may also comprise down-counters with a load function. That is, the contents of the period-setting section 34 and the size-setting section 38 are respectively loaded into the down-counters at the beginning, wherein one is counted down in response to the clock signal CLK and the other is counted down in response to the completion signal END. The borrow signal output from the down-counter is used as the prescribed coincidence detection signal.

That is, it is so constructed that the borrow signal output from the down counter functioning as the period counter is supplied to the set input terminals of the F/F 40, and the borrow signal output from the down-counter functioning as the size counter is led to the I 41. This construction does not require comparators 35 or 39. However, the $\overline{Q}$ output of the F/F 40 and the output of the I 41 should be supplied to the respective load terminals of the corresponding down-counters (not to the clear terminals CLR of the counters 33 and 37 as in the previous embodiment).

What is claimed is:

1. A DMA bus load varying unit applied to a data processing system having a DMA bus and a memory connected to the DMA bus, comprising:
   a. mode-designating means for designating a memory read and write operation, a continuous operation of the memory read and write operation, and a memory start and a memory stop operation of the memory read and write operation;
   b. clock-pulse generating means connected to said mode-designating means;
   c. first counting means connected to said clock-pulse generating means for counting clock signals from said clock-pulse generating means;
   d. period-setting means for specifying an arbitrary period;
   e. first comparing means for comparing the output from said first counting means with the output from said period-setting means and for producing a first coincident signal when they are equal;
   f. DMA bus request signal generating means connected to said first comparing means for producing the DMA bus request signal in accordance with the coincident signal;
   g. DMA bus circuit means connected to said mode-designating means and said DMA bus request signal generating means which is triggered by the DMA bus request signal and performs the memory access through the DMA bus in accordance with the mode designated by said mode-designating means;
   h. second counting means connected to said DMA bus circuit means for counting the number of DMA bus cycles of said DMA bus circuit means;
   i. transfer data size-setting means for specifying an arbitrary transfer data size; and
   j. second comparing means for comparing the output from said second counting means and the output from said transfer data size-setting means and for producing a second coincident signal when they are equal, the second coincident signal being supplied to initialize said DMA bus circuit means.

2. A DMA bus load varying unit according to claim 1, wherein said DMA bus circuit means includes a memory address counter which generates an address to access the memory, and which further comprises memory start address generating means for supplying a start address to the memory address counter.

3. A DMA bus load varying unit according to claim 1, wherein said first counting means is reset by the coincidence signal from said first comparing means.

4. A DMA bus load varying unit applied to a data processing system having a DMA bus and a memory connected to the DMA bus, comprising:
   a. mode-designating means for designating a memory read and write operation, a continuous operation of the memory read and write operation, and a start and stop operation of the memory read and write operation;
   b. clock-pulse generating means connected to said mode-designating means;
   c. first counting means connected to said clock-pulse generating means for counting clock signals from said clock-pulse generating means;
   d. period-setting means for specifying an arbitrary period;
   e. first comparing means for comparing the output from said first counting means with the output from said period-setting means and for producing a first coincident signal when they are equal;
   f. DMA bus request signal generating means connected to said first comparing means for producing the DMA bus request signal in accordance with the coincident signal;
   g. DMA bus circuit means connected to said mode-designating means and said DMA bus request signal generating means which is triggered by the DMA bus request signal and performs the memory access through the DMA bus in accordance with the mode designated by said mode-designating means;
   h. second counting means connected to said DMA bus circuit means for counting the number of the DMA bus cycles of said DMA bus circuit means;
   i. transfer data size-setting means for specifying an arbitrary transfer data size;
   j. second comparing means for comparing the output from said second counting means and the output from said transfer data size-setting means and for producing a second coincident signal when they are equal, the second coincident signal being supplied to initialize said DMA bus circuit means; and
   k. timer means for counting clock pulses from said clock-pulse generating means to perform time measurement until a specified data transfer is completed.

5. A DMA bus load varying unit according to claim 4, wherein said DMA bus circuit means includes a memory address counter which generates an address to access the memory, and which further comprises memory start address generating means for supplying a start address to the memory address counter.

6. A DMS bus load varying unit according to claim 4, wherein said first counting means is reset by the coincidence signal from said first comparing means.

* * * * *